No. 794,413.

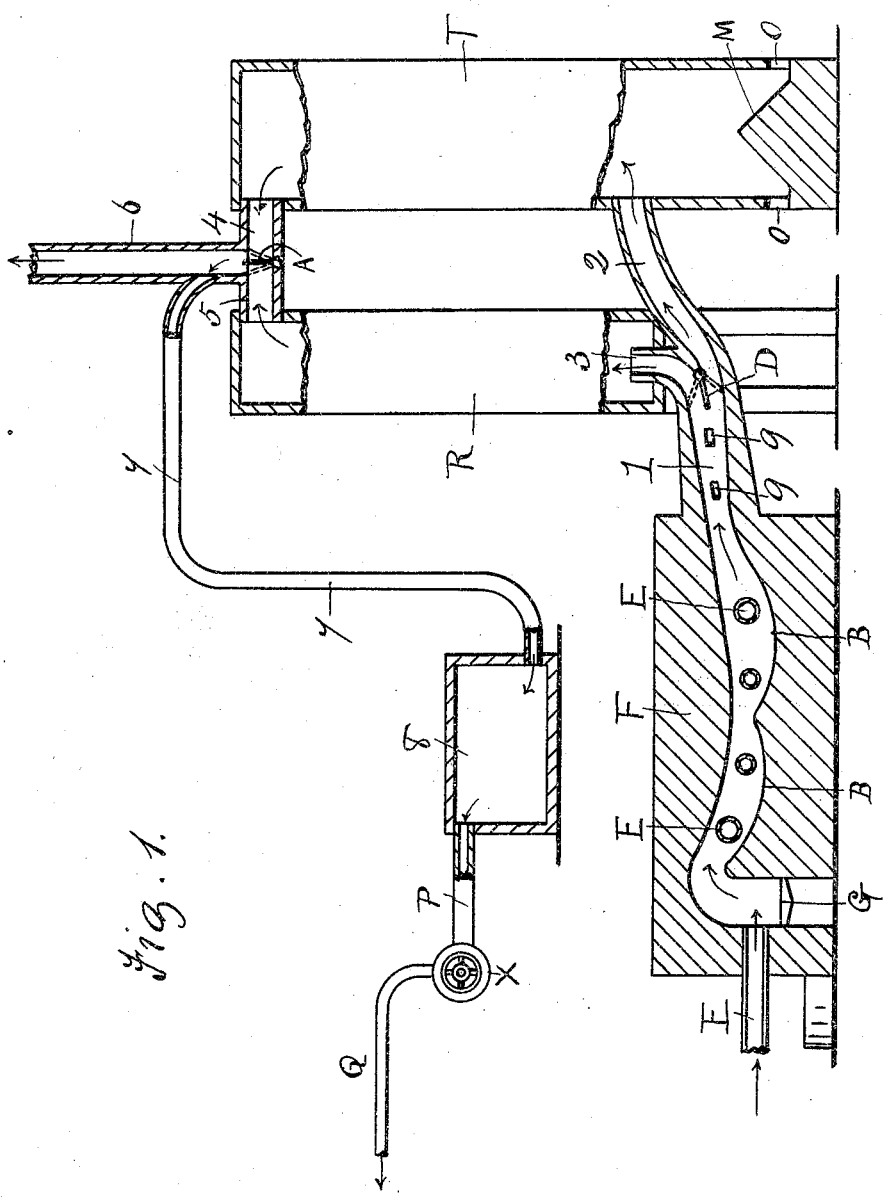

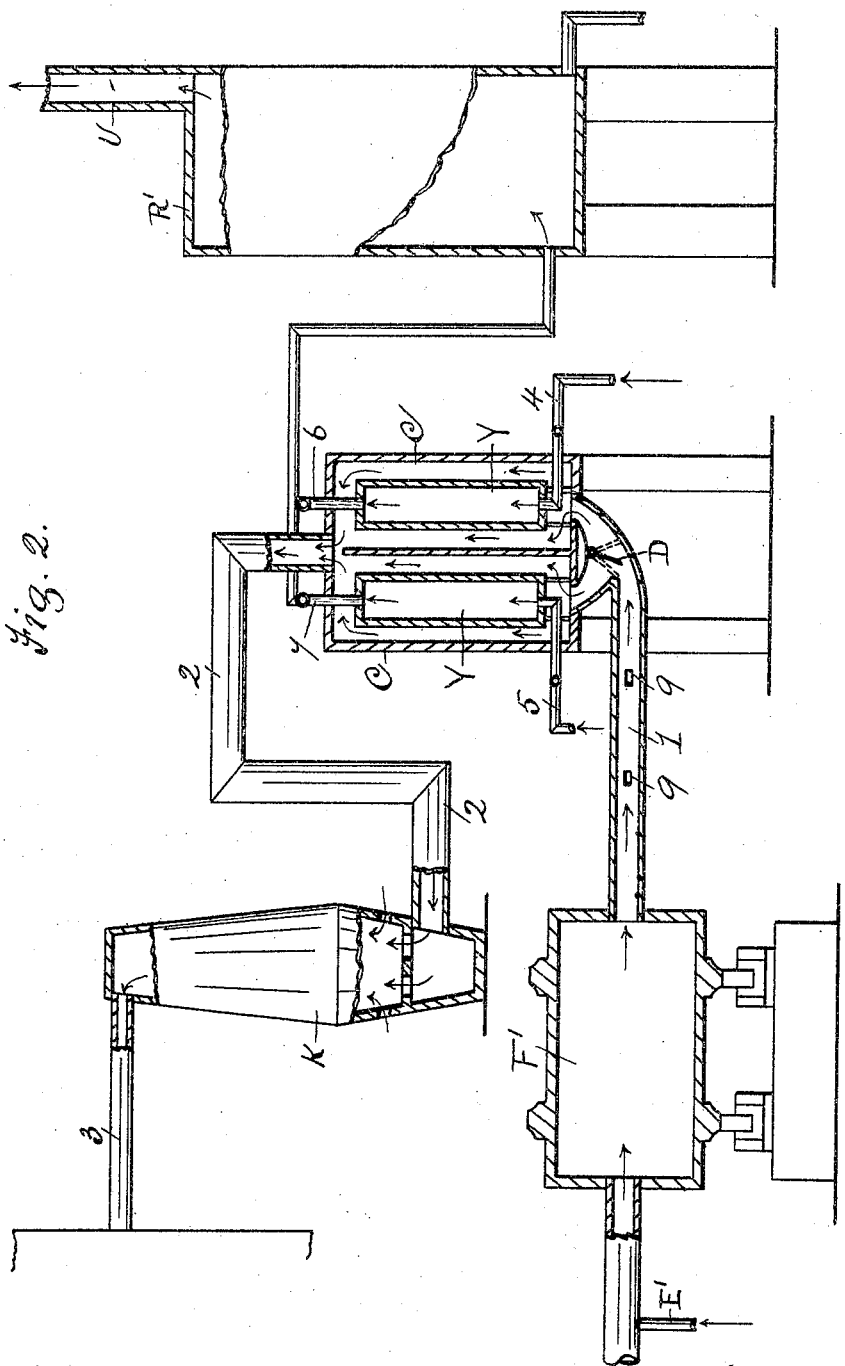

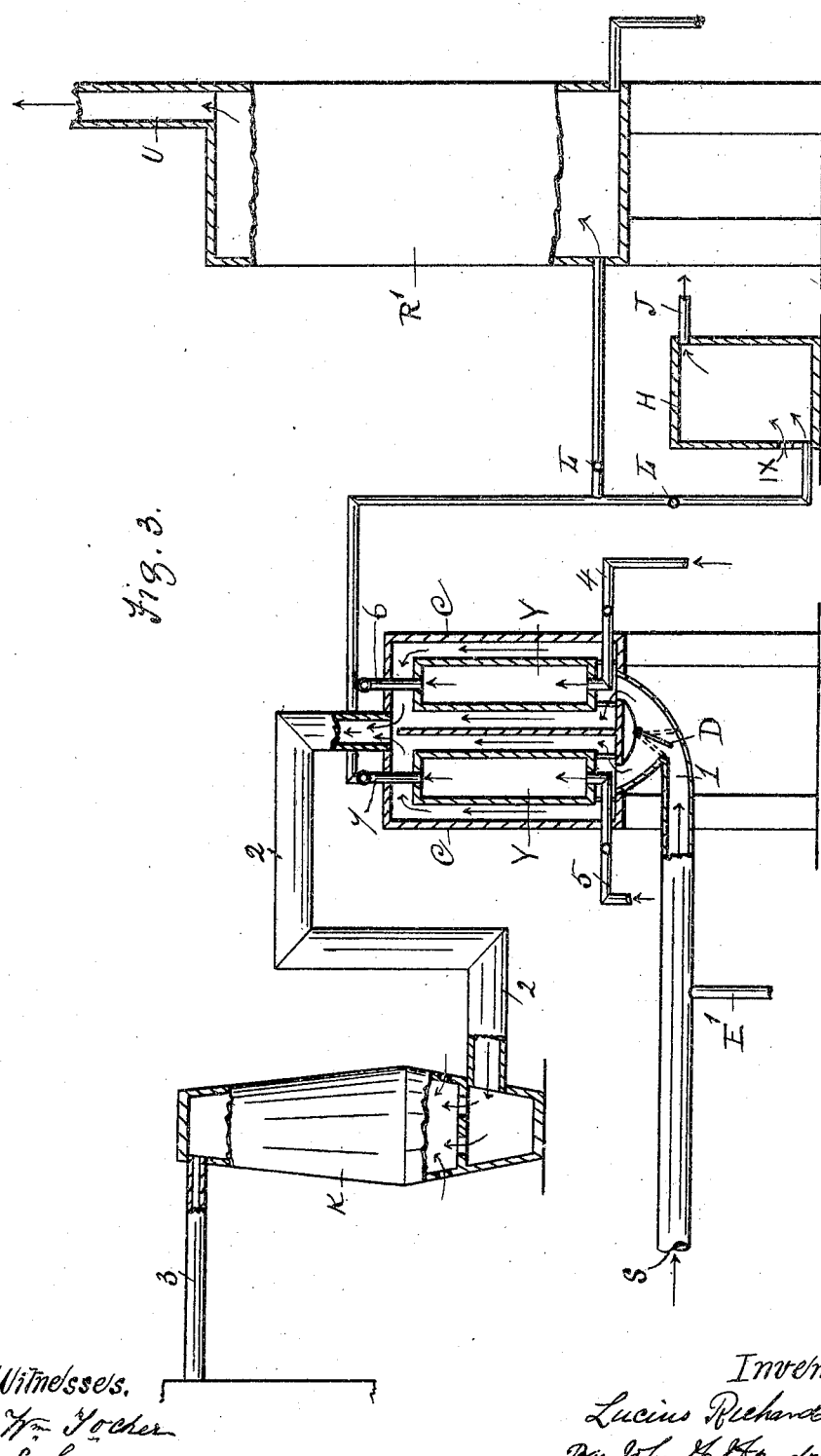

Patented July 11, 1905.

UNITED STATES PATENT OFFICE.

LUCIUS RICHARD KEOGH, OF HAMILTON, CANADA.

PROCESS OF MAKING ALUMINIUM COMPOUNDS.

SPECIFICATION forming part of Letters Patent No. 794,413, dated July 11, 1905.

Application filed January 25, 1904. Serial No. 190,428.

*To all whom it may concern:*

Be it known that I, LUCIUS RICHARD KEOGH, a citizen of Canada, residing at Hamilton, in the county of Wentworth and Province of Ontario, Canada, have invented new and useful Improvements in Methods of Making Aluminium Compounds and By-Products, of which the following is a specification.

The object of the invention is to provide a new and improved method of making, as products, aluminium compounds and by-products, such as aluminium sulfate, aluminate of soda, anhydrous alumina, hydrated alumina, sodium sulfate, sodium sulfid, sodium carbonate, hydrochloric acid, sulfureted hydrogen, sulfur dioxid, sulfur trioxid, sulfuric acid, sulfur, sulfid of iron, sulfate of iron, and other substances that may be contained in the raw materials—viz., aluminous minerals, pyrites, coal or other form of carbonaceous material, sodium chlorid, sodium sulfates, alumina, sulfates of alumina, and furnace or burner gases.

The process consists, essentially, in heating charges composed of mixtures of raw materials above mentioned in the presence of steam and sulfur compounds to form products, as above shown.

In carrying out the process I use different combinations of well-known apparatus, including some or all of the following, viz: Siemens gas-generators, mechanical or hand balling-furnaces, with or without sulfate-pans, or furnaces according to my United States Patents No. 740,364, of 1903, and No. 744,765, of 1903, Hargreaves sodium sulfate apparatus, Frasch converters, aluminium-sulfate towers and tanks, according to Richardson, sodium-sulfate pans, pan and roaster condensers for condensing hydrochloric acid, steam generators or boilers, engines, evaporators, drying-kilns, calcining-furnaces, roasters, pressure blowers or exhausters, precipitating, separating, and crystallizing vessels, with any necessary connections, such as for utilizing waste heat or exhaust-steam between different parts of the apparatus, the various parts of which apparatus can be arranged in any convenient position, but where equivalent apparatus is not already in use, which it is desirous of retaining, I prefer to use the special apparatus shown in the accompanying drawings, forming part of this specification, in which—

Figure 1 is a sectional side elevation of apparatus used for treating furnace charges through both stages in one heat with a naked fire. Fig. 2 is a sectional side elevation of apparatus used for treating furnace charges in two operations corresponding to two stages of the process, and Fig. 3 is a sectional side elevation of apparatus used for treating furnace-charges through both stages in one heat in a closed chamber.

The apparatus shown in Fig. 1 consists, essentially, of a hand balling-furnace F, supplied with steam through pipes E and heated by products of combustion of burning fuel held on a grate G, which passes over a bed B to a flue 1, which is provided with air-draft holes 9 and which connects by branches 2 and 3, the connection being controlled by a damper D alternately with a sulfate-tower T and with a hydrochloric-acid roaster condensing-tower R, these towers being provided with exit-flues 4 and 5, respectively, controlled by a damper A and which join into a chimney-flue 6, having a branch flue 7 leading to a scrubbing-chamber 8, from which the gases are drawn through a pipe P by an exhauster X and from it are blown through a pipe Q to tanks or chambers used for forming carbonate of soda and hydrated alumina. The chamber 8 contains lime or carbonate of lime used to remove traces of acids of chlorin, sulfur, and nitrogen that may pass through the towers T and R. The tower T is provided with a sloping bottom M, having open spaces O O at the sides for the easy removal of the material treated. The tower R is supplied with water and the acid is removed in the ordinary way, while the waste gases escape through the flues 5 and 6. The tower T may be constructed according to Richardson and may be supplied with water or with weak liquors, as set forth by him. (See British Patent No. 733 of 1860. Also the stone shelves specified by Richardson may be dispensed with.

The apparatus shown in Fig. 2 consists, essentially, of a mechanical balling-furnace F', supplied with steam through a pipe E and heated by gas from a Siemens gas-generator, which gas enters at S, while the gaseous products of combustion pass off through a flue 1, which is provided with air-draft holes 9 and is controlled by a damper D alternately to the chambers C and C, and thence through a flue 2 and through a Frasch converter K to a pipe 3, whence they pass to sulfate-tower, as in Fig. 1. In the chambers C and C are cylinders Y and Y, which are heated by the gaseous products of combustion passing through the chambers C and C and are provided with pipes 4 and 5 for admitting steam and with pipes 6 and 7 for carrying off the gaseous products to the hydrochloric-acid pan condensing-tower R', having an outlet-flue U for the escape of waste gases to the air or chimney-stack. The tower R' is supplied with water in the ordinary way, and in the Frasch converter K pyrites is burned in the regular manner. The aluminium-sulfate tower T and the scrubbing-chamber 8 (shown in Fig. 1) may also be used with the apparatus shown in Fig. 2 or Fig. 3. The Frasch converter K (shown in Fig. 2) may be dispensed with, if desired, and it may also be used with the apparatus shown in Fig. 1 or Fig. 3, if so desired. The closed chambers or cylinders Y and Y (shown in Fig. 2) may, to avoid expense, be replaced by Hargreaves cylinders, to be used as are these chambers, when the Hargreaves cylinders are already on hand.

The closed cylinders Y and Y (shown in Fig. 2) may be strongly heated direct from S, thus using the chambers C and C as a furnace without the use or intervention of the furnace F', as shown in Fig. 3, and this arrangement may be used to carry on both stages of the operation. In this case it is not necessary to remove the charge until completion of the second stage. If this be done, the hydrogen sulfid evolved in the second stage of the process will require to be ignited before being recovered. This may be done in a chamber H. (Shown in Fig. 3, in which are also shown air-draft holes 1$^\times$ to admit the necessary air, also a pipe J to convey any sulfur dioxid formed to wherever it is to be employed, and dampers L L to control the direction of any hydrochloric acid formed to the tower R' and of the sulfur gases to the chamber H, respectively.)

The hand balling-furnace (shown in Fig. 1) and the mechanical balling-furnace (shown in Fig. 2) are interchangeable. Also it is understood that any of the furnaces employed can be heated by gas or by coal fire direct.

I proceed as follows: The sulfate-tower T (shown in Fig. 1) is filled with a charge composed of aluminous minerals in a raw or roasted state—such as clays, kaolin, pyritous shales, coal-ashes, bituminous or alum shales, &c.—to take up, as hereinafter explained, the sulfurous gases evolved in the process and form sulfate of alumina more or less pure, according to the nature of the ores used; but these gases may be used for making sulfur or sulfuric acid or other sulfates in well-known ways, in which case this tower can be dispensed with. The cylinders Y and Y, (shown in Fig. 2,) if used, are filled with a charge composed of a mixture of sulfate of aluminium and sodium chlorid with or without impurities and with or without carbonaceous material. This mixture may be made with the aid of water, and it may also with advantage be formed into small briquets or lumps; also, the carbonaceous material may be added to this charge after the first stage of the process is completed and before the second stage is begun; but, if used, it is more economical to add it at first; also, the sulfate may be run in in the form of a concentrated solution on the other material of the charge in the chamber or furnace. The proportion of sodium chlorid in this charge will depend upon the amounts of sulfuric acid and alumina present. It may be so adjusted as to form bisulfate of soda or normal sulfate of soda in the subsequent reaction, or partly both, while at the same time giving the proper proportions to combine single equivalents of soda and alumina or three equivalents of soda with one of alumina, or partly both, in the second stage of the process. The proportions therefore can be varied, so as to yield in the finished process alumina and carbonate of soda in greater or less relative proportions, according as desired. Heat is applied to the cylinders Y and Y alternately, as above explained, and steam is passed through and over the charge to decompose the sodium chlorid and sulfate of aluminium. Alumina and sulfate of soda are formed while hydrochloric acid is evolved and is condensed in the pan condensing-tower R'. (Shown in Fig. 2.) The complete reactions are as follows for normal sulfate of aluminium treated with equivalent amount of sodium chlorid:

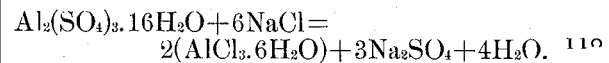

The steam assists in the evolution and complete elimination of the hydrochloric acid. Equivalent materials may be used in this stage of the process, as anhydrous sulfate of alumina, basic sulfate of alumina, or alumina, or mixtures thereof, in whole or in part, for the normal sulfate of alumina, and sodium sulfates, soda, or the lower aluminate of soda, obtained as hereinafter set forth by Bayer's method of precipitation, or mixtures thereof for the sodium chlorid in part. If sulfate of alumina be used in the charge in excess of sodium chlorid or its equivalent, sulfur dioxid will be evolved therefrom and may be used as is the other sulfur dioxid obtained in the process. It is understood that pure materials may be used for this stage of the process including pure sulfate of alumina and pure sodium chlorid or sulfate of soda. However, if any sulfate of iron be present in this first stage of the process it is changed with the sodium chlorid by the action of heat and steam into oxid of iron, hydrochloric acid, and sulfate of sodium, thus:

$$Fe_2(SO_4)_3 + X(H_2O) + 6NaCl = 2(FeCl_3.6H_2O) + 3Na_2SO_4 + (X-12)H_2O$$

or $$FeSO_4.7H_2O + 2NaCl = FeCl_2.4H_2O + Na_2SO_4 + 3H_2O,$$

and then $$2(FeCl_3.6H_2O) = Fe_2O_3 + 6HCl + 9H_2O$$

and $$FeCl_2.4H_2O = FeO + 2HCl + 3H_2O.$$

It is understood that more or less steam may be needed, according to the nature of the mixture used, which may be more or less basic and more or less hydrated and also according to the extent of contact between said steam and materials of the charge. This first stage of the process may also be performed in the balling-furnace F or F', and in this latter case the chambers C and C may be dispensed with, as well as the cylinders Y and Y, while the hydrochloric acid evolved is condensed in the roaster-condensing tower R, (shown in Fig. 1,) the waste gases from which pass through the flue 5 to the chimney-flue 6. If comparatively pure sulfate of alumina and sodium chlorid in equivalent quantities be used and no carbonaceous material be added, there will result in the first stage of the treatment a mixture of comparatively pure anhydrous alumina and sulfate of sodium, which can then be removed, if desired, and recovered by dissolving the sulfate out of the alumina. The temperature required for this result may be comparatively low, not exceeding 300° centigrade; but if the anhydrous alumina is to be used for reduction to metallic aluminium the temperature should be high enough to destroy its power of recombining with water in the subsequent washing, and this requires a strong heat. The charge may now be removed and the alumina and sulfate of soda recovered, or the second stage of the operation may now be performed in the cylinders Y and Y, if constructed as shown in Fig. 3; but they will require to be raised for the purpose to a red heat, or it may be performed in the balling-furnace F, Fig. 1, or F', Fig. 2, as follows: In the furnace used is heated the carbonaceous mixture resulting from the treatment above described or a charge composed of a mixture of alumina, sodium sulfate, and carbonaceous material, with or without impurities, or a mixture which when heated in the presence of steam will form alumina and sodium sulfate, with or without impurities and with or without carbonaceous material, as set forth above. This mixture also may be made with the aid of water. It may also with advantage be formed into briquets or lumps, and the carbonaceous material required may be added either before or after the completion of the first stage of the process to the material of the charge or to the briquets or lumps and should be in quantity sufficient to reduce the sulfate of sodium to sulfid of sodium. It is understood that pure materials may be used in this second stage of the process. Also the equivalent materials may be used as above stated in the first stage. The sodium chlorid may be completely replaced by equivalent materials in the second stage. I may also use other forms of sodium, as the bisulfate, sulfite, or thiosulfate, which, with carbonaceous material, will reduce to sulfid of sodium, or I may use sulfid of sodium, in which case I may dispense with the carbonaceous material. This mixture for the second stage of the process will be economically supplied from the first stage of the process as conducted in the cylinders Y and Y, (shown in Fig. 2;) but it may be supplied from other sources.

The treatment required in the second stage of the process is as follows: The mixture of sulfate of sodium, alumina, and carbonaceous material placed or formed in the furnace is heated to a red heat, and in this way the sulfate of sodium is reduced by the carbon to sulfid of sodium—as, for example, in the case of normal sulfate of sodium, thus:

$$Na_2SO_4 + 2C = Na_2S + 2CO_2,$$

carbon dioxid being evolved. If sulfate of alumina was present in the original charge in excess of chlorid of sodium, sulfur dioxid will also be evolved and alumina formed at this stage. Any oxid of iron present or formed in the furnace charge is also reduced by the action of the heat and carbon or reducing-gases formed to metallic iron or ferrous oxid, or partly to both, thus:

$$Fe_2O_3 + C = FeO + CO.$$

$$Fe_2O_3 + 3C = Fe_2 + 3CO.$$

$$FeO + 2C = Fe_2 + 2CO.$$

There results in the furnace a mixture of alumina and sulfid of sodium, with or without impurities—such as oxids of iron, metallic iron, &c.—together with any excess of unburned carbonaceous material. It is desirable to keep the silica as low as possible, and for that purpose carbonaceous material low in ash, and especially in silica, is beneficial. It is also desirable to prevent the formation of sulfites and thiosulfates in the furnace, and for that purpose it is necessary to maintain a reducing atmosphere until the sulfid is formed. When this has been accomplished and the charge is highly heated, steam is passed into and over the charge in the furnace, while more or less air is passed through the air-draft holes 9 or $1^\times$, as the case may be, when reactions occur by which the sulfur is liberated from its combinations in the charge and passes off as sulfurous gases, while aluminate of soda is formed and remains in the furnace, together with the iron in the form of oxid or sulfid, or partly both, depending upon the completeness of the reactions. The sulfid of iron may be recovered as such on dissolving out the aluminate of soda and may be burned to oxid and sulfur dioxid or used to make vitriol; but it is desirable to push the operation to the point where the sulfur is all removed from the charge. However, if reducing-gases be in excess in the furnace, as will be especially so if this second stage is conducted in the cylinders Y and Y, the gaseous products evolved will be rich in sulfureted hydrogen, while combined sulfur will remain in the charge. This sulfureted hydrogen may be burned to sulfur dioxid or to sulfur, if desired, as shown, in the flues 1 and in chamber H, Fig. 3, so recovering the sulfur used in the process. If a sufficient supply of air is admitted to the air-draft holes 9 or $1^{\times}$ at the proper time, the sulfur and sulfur-gases will be burned to sulfur dioxid, which may be allowed to escape or may be used to form sulfuric acid or sulfate of sodium, or to produce sulfate of alumina in any ordinary way, or it may be passed to the sulfate-tower T, Fig. 1, for that purpose, as hereinafter explained. The carbon dioxid formed can be recovered and used for the formation of sodium carbonate and hydrated alumina from the sodium aluminate, as hereinafter explained. In case the outlet-flue is constructed as shown in Fig. 1, then these gases containing sulfur dioxid are directed by the damper D through the branch flue 2 to the tower T.

The principal reactions which occur in the second stage of the process are as follows:

$Al_2O_3 + Na_2S + H_2O = Al_2O_3 \cdot Na_2O + H_2S$.

$Al_2O_3 + Na_2S + FeO + H_2O =$
$\qquad Al_2O_3 \cdot Na_2O + FeS + H_2O$.

$O + Fe + H_2S = FeS + H_2O$.

$2FeS + 7O = Fe_2O_3 + 2SO_2$.

$H_2S + 3O = H_2O + SO_2$.

Other allied reactions may also take place. Other products may also be formed—for example, lower aluminates, as $Al_2O_3 \cdot 3Na_2O$; but the end products in every case should consist chiefly of aluminate of soda, with or without impurities, such as ferric oxid, which remains in the furnace, and sulfur dioxid, carbon dioxid, and steam, which are evolved as gases, and this is the result to be attained. If the fuel used contains combined nitrogen, cyanids of soda and iron may be formed. Compounds of soda and iron may be desirable to remove all of these substances. This may be done by admitting sufficient heat, air, and steam to all parts of the charge, these compounds being thus decomposed to volatile forms of nitrogen, carbon dioxid, and sulfur dioxid, with oxid of iron and carbonate of soda. A slight excess of sulfate of soda will also be found beneficial in removing the cyanid of soda. If the treatment has been properly conducted, the furnace-gases passing through the flues 1, Figs. 1 and 2, and the pipe J, Fig. 3, will chiefly consist of oxids of nitrogen, while small quantities of chlorin and ammonia may also be present and traces of other substances. These furnace-gases may be passed to the sulfate-tower T (shown in Fig. 1) to form sulfates and the residual gases passed thence to flues 6 and 7. (Shown in Fig. 1.)

In the tower T, Fig. 1, the hot gases entering from below pass through the charge of aluminous material, where the steam is condensed and where the oxids of sulfur enter into combination with the alumina and iron oxids of the ores, so forming sulfate of alumina, with more or less sulfate of iron. This action is assisted by the porous and hygroscopic nature of the minerals used, by the heat, by the steam or water and the oxygen present, and by the catalytic action of several substances present—such as oxids of nitrogen, oxid of iron, sulfates, and traces of chlorin, &c.—used. Any sulfites or thiosulfates formed in the tower T will if sufficient oxygen be present and conditions be favorable ultimately become sulfates, and this is the end to be attained. Different zones of temperatures will exist in the tower, and these will also be zones of different degrees of moisture, the hottest and driest being at the bottom, and this also assists in the formation of the sulfates desired. The hottest portion, however, should not be above about 450° centigrade, as a higher temperature will tend to decompose the sulfates formed. The ore as it becomes impregnated with sulfates is drawn off below and placed in cisterns or tanks, where the sulfate is leached out of it, fresh ore or the leached ores being added at the top of the tower to take the place of that withdrawn, while the weak sulfate liquors may be run in gradually at the top of the tower or concentrated in tanks by repeated passage over freshly-treated ores. Oxids of nitrogen or other catalytic agents may also be introduced into the mixture of gases used in the tower, if desired.

The carbon-dioxid gas, together with the nitrogen, is passed out of the tower T by the flue 4 to the chimney-flue 6 and may contain oxids of nitrogen and of sulfur, and possibly chlorin. This carbon-dioxid gas may be used to precipitate the alumina from the aluminate of soda in hydrated form; but this may also be done in other well-known ways, as by Bayer's method, in which case the soda is recovered as a lower aluminate. The necessary portion of these gases is drawn down the pipe 7, through the chamber 8 and pipe P by the exhauster X, and is made to pass over the lime held in the chamber 8 to remove these undesirable gases before being taken by the pipe Q to the vessels where the carbon dioxid is used to form carbonate of soda and alumina from the sodium aluminate obtained in the furnace treatment, which may or may not be separated from impurities by leaching the furnace product or ball. It is preferable, however, to remove all impurities present. The precipitation takes place thus:

$$Al_2O_3.Na_2O + 3H_2O + CO_2 = 2Al(OH)_3 + Na_2CO_3.$$

Carbon dioxid from other sources may, however, be used for this purpose.

Any loss of sulfur in the process can be made good by pyrites burned in the Frasch converter K, Fig. 2, or by sodium sulfate or sodium sulfid or aluminium sulfate or similar substances added to the charges or by the use or addition of sulfur dioxid or burner-gases in the tower T, Fig. 1.

Having thus described my invention, I claim as new and desire to secure by Letters Patent—

1. The herein-described process for making aluminium compounds and by-products, which consists in subjecting aluminous materials to the action of sulfur-gases to form sulfate of alumina, mixing this sulfate of alumina with sodium chlorid and heating the mixture in the presence of steam to evolve gaseous hydrochloric acid with the steam and to form a second mixture of alumina and sulfate of soda, condensing the gaseous hydrochloric acid, heating this second mixture to form a third mixture of alumina and sulfid of soda, heating this third mixture in the presence of steam and air to form aluminate of soda, precipitating the alumina in hydrated form, and recovering the soda.

2. The herein-described process for making aluminium compounds and by-products, which consists in subjecting aluminous materials to the action of sulfur-gases to form sulfate of alumina, mixing this sulfate of alumina with sodium chlorid and carbonaceous material and heating the mixture in the presence of steam to evolve gaseous hydrochloric acid with the steam and to form a second mixture of alumina, sulfate of soda and carbonaceous material, condensing the gaseous hydrochloric acid, heating this second mixture to form a third mixture of alumina, sulfid of soda and carbonaceous material, heating this third mixture in the presence of steam and air to form aluminate of soda and to evolve sulfurous gases, recovering the aluminate of soda, precipitating the alumina in hydrated form and recovering the soda.

LUCIUS RICHARD KEOGH.

Witnesses:
JOHN R. HENDRY,
L. E. GEORGE.